United States Patent [19]

Taniyasu et al.

[11] E Re. 30,510

[45] Reissued Feb. 10, 1981

[54] PROCESS FOR PREPARING CATALYST FOR OLEFIN POLYMERIZATION

[75] Inventors: Ryozo Taniyasu, Yokohama; Hideo Kurokawa, Kawasaki; Takeshi Saito, Chiba, all of Japan

[73] Assignee: The Lion Fat and Oil Company Limited, Tokyo, Japan

[21] Appl. No.: 54,619

[22] Filed: Jul. 3, 1979

Related U.S. Patent Documents

Reissue of:

[64] Patent No.: 4,107,080
Issued: Aug. 15, 1978
Appl. No.: 793,545
Filed: May 4, 1977

[30] Foreign Application Priority Data

May 10, 1976 [JP] Japan ..... 51-52161

[51] Int. Cl.[3] ..... B01J 31/02
[52] U.S. Cl. ..... 252/431 C; 252/429 R
[58] Field of Search ..... 252/429 R, 431 C

[56] References Cited

U.S. PATENT DOCUMENTS

| | | | |
|---|---|---|---|
| 1,923,571 | 8/1933 | Galle et al. | 252/429 R |
| 3,002,038 | 9/1961 | Lucchesl | 252/429 R X |
| 3,029,253 | 4/1962 | Wheeler et al. | 252/429 R |
| 3,565,824 | 2/1971 | Pierce et al. | 252/429 R |
| 3,666,686 | 5/1972 | Trivedi | 252/429 R |
| 3,674,845 | 7/1972 | Reni et al. | 252/429 R X |
| 3,769,363 | 10/1973 | Brennan | 260/683.15 B |
| 3,952,071 | 4/1976 | Isa et al. | 260/683.15 B |
| 4,107,080 | 8/1978 | Taniyasu et al. | 252/431 C |

*Primary Examiner*—Delbert E. Gantz
*Assistant Examiner*—William G. Wright
*Attorney, Agent, or Firm*—Armstrong, Nikaido, Marmelstein & Kubovcik

[57] ABSTRACT

Disclosed is a process for preparing a catalyst for polymerizing a mono olefin having 6 through 20 carbon atoms comprising mixing (a) a fatty acid having not less than 3 carbon atoms and (b) aluminum chloride, aluminum bromide or a mixture thereof in an amount of 0.7 through 1.2 mol of the component [(b)] *(a) (i.e. aliphatic carboxylic acid)* based upon 1 mol of the component [(a)] *(b) (i.e. aluminum chloride, aluminum bromide or a mixture thereof),* to effect the condensation reaction of both components and a catalyst prepared by said process. This catalyst is suitable for use in the production of an olefin polymer having low viscosity and a high viscosity index.

7 Claims, No Drawings

PROCESS FOR PREPARING CATALYST FOR OLEFIN POLYMERIZATION

Matter enclosed in heavy brackets [ ] appears in the original patent but forms no part of this reissue specification; matter printed in italics indicates the additions made by reissue.

The present invention relates to a process for preparing a catalyst for use in olefin polymerization and the catalyst prepared by said process. More specifically, it relates to a process for preparing a polymerization catalyst for the production of a liquid olefin polymer having low viscosity and a high viscosity index from mono olefin having 6 through 20 carbon atoms and the catalyst prepared by said process.

Lewis acid catalysts represented by aluminum chloride are well known as a polymerization catalyst of olefin. According to cation polymerization processes for olefin using the Lewis acid catalysts, polymers having a high polymerization degree, that is, a high viscosity, can be prepared. However, olefin polymers having a low viscosity and a high viscosity index suitable for use in the fields of gas turbine engine oil, hydraulic fluid for aircraft, lubricating oil and the like cannot generally be produced by the cation polymerization processes. Of course, if the polymerization temperature is increased, olefin polymers having a low viscosity can be produced even by using Lewis acid catalysts such as aluminum chloride. However, there are problems in such cases that, due to the simultaneous generation of the isomerization of a polymer skeleton, not only does the viscosity index of the polymer thus obtained decrease but also, the formation of dimer increases.

Under these circumstances, various catalysts have been heretofore proposed for use in the production of olefin polymers having low viscosity and a high viscosity index under mild conditions. For instance, Japanese laid-open patent application (KOKAI) No. 49-11804 (1974) proposes catalysts comprising adding an excess of boron trifluoride to an addition product of boron trifluoride and valeric acid. However, there is a problem in the production of the catalyst that excess heat generation during the formation of the addition product should be depressed so as not to decrease the catalytic activity of the catalyst due to the structure change of the addition product by the excess heating. For this reason, the addition product must be prepared at a temperature of 50° C. or less by using a large-capacity cooling apparatus. In addition, there is also a problem that, since high corrosive hydrogen fluoride is formed even in the presence of trace amounts of water because the catalyst contains free boron trifluoride, a corrosion-resistant apparatus must be used. Furthermore, since the addition product is not stable during olefin polymerization and the addition of a carbonyl group to the polymer occurs at a temperature of 30° C. or more to deactivate the catalytic activity, the polymerization temperature should be adjusted to approximately 10° C. Therefore, when this catalyst is used in the polymerization reaction which evolves a large heat generation, not only is the cooling a serious problem but, also, the free boron trifluoride present in the catalyst should be treated after polymerization.

Japanese laid-open patent publication (KOKAI) No. 50-111001 (1975) proposes catalysts for olefin polymerization comprising a mixture of polyol derivative and aluminum halide. There is a description in the publication that, when olefin having 6 or more carbon atoms is polymerized in the presence of these catalysts, an olefin polymer having viscosity and a high viscosity index can be produced with a good yield. However, with these catalysts, there is a problem that a large heat generation also evolves during their preparation, and especially, since the aluminum halide is solid, cooling is difficult.

Thus, the conventional polymerization catalysts generate a large amount of heat during their preparation step, and this heat generation not only requires an extra cooling operation but also, can result in adverse effects to the catalytic activity per se. Therefore, it is still desired to develop a process for preparing such catalysts wherein no or at least a small amount of heat is generated during the preparation step.

Accordingly, the objects of the present invention are to obviate the afore-mentioned problems of the conventional olefin polymerization catalysts and to provide a novel process for preparing a catalyst suitable for producing an olefin polymer having a relatively low viscosity and a high viscosity index from a mono olefin having 6 through 20 carbon atoms, without causing heat generation problems during the preparation step of the catalyst and the catalyst prepared by said process. The catalyst obtained according to the present invention, therefore, exhibits stable catalytic effect on the olefin polymerization.

In accordance with the present invention, there is provided a process for preparing a catalyst for polymerization of a mono olefin having 6 through 20 carbon atoms comprising mixing (a) a fatty acid having not less than 3 carbon atoms and (b) aluminum chloride, aluminum bromide or a mixture thereof, in an amount of 0.7 through 1.2 mol, preferably 0.8 through 1.1 mol, of the component [(b)] *(a) (i.e., the fatty acid or the aliphatic carboxylic acid)* based upon 1 mol of the component [(a)] *(b) (i.e., the aluminum chloride, aluminum bromide or mixture thereof),* to effect the condensation reaction of both components.

In accordance with the present invention, there is also provided a catalyst for polymerization of a mono olefin having 6 through 20 carbon atoms prepared by mixing (a) a fatty acid having not less than 3 carbon atoms and (b) aluminum chloride, aluminum bromide or a mixture thereof, in an amount of 0.7 through 1.2 mol, preferably 0.8 through 1.1 mol, of the component [(b)] *(a)* based upon 1 mol of the component [(a)] *(b),* to effect the condensation reaction of both components.

The component (b) is referred to hereinbelow as aluminum halide.

In the preparation of the catalyst according to the present invention, when the amount of the [aluminum halide] *fatty acid* is less than 0.7 mol, [the condensate produced cannot smoothly polymerize an olefin monomer, whereas, when the amount is more than 1.2 mol,] simultaneous polymerization occurs, due to the catalytic effect of aluminum halide per se, so that the viscosity of the olefin polymer unpreferably increases *so that, when the amount is more than 1.2 mol, the concensate produced cannot smoothly polymerize an olefin monomer.*

Fatty acids used in the present invention include, those which have at least three carbon atoms per one molecule and, preferably, include, for example, propionic acid, n-butyric acid, iso-butyric acid, trimethyl acetic acid, n-valeric acid, iso-valeric acid, caproic acid, enanthic acid, caprilic acid, 2-ethyl hexanoic acid, capric acid, lauric acid and the like. Among these exemplified fatty acids, caproic acid, enanthic acid, caprilic acid, 2-ethyl hexanoic acid and capric acid are most preferable for use in the present invention. If it is desired to produce an olefin polymer having a very low viscosity of approximately 20 c.s., use of caprilic acid, 2-ethyl hexanoic acid and capric acid is most preferable. A mixture of any two or more fatty acids mentioned above can be used in the present invention. Fatty acids having a smaller number of carbon atoms, such as acetic acid, are not used in the present invention. This is because the condensation products of such acids with aluminum halide have a high melting point and because the condensation products solidify in the polymerization reactor.

The condensation of the above-mentioned fatty acids with the aluminum halide is generally carried out at a temperature within the range of from 30° to 150° C., preferably, from 50° to 100° C. A lower temperature tends to solidify the fatty acids, whereas a higher temperature results in the rapid condensation reaction of the fatty acids with the aluminum halide. This results a vigorous generation of hydrogen halide gas, the removal of which is difficult and creates a new problem.

Depending on the fatty acids used and the reaction temperature, the condensation reaction is generally continued for approximately 1 through 3 hours. During the condensation reaction, since hydrogen halide equimolar with the fatty acid is produced, the catalyst preparation is completed after the removal of the hydrogen halide.

The catalyst prepared in accordance with the present invention is suitable for use in the preparation of an olefin polymer having a low viscosity and a high viscosity index, from a mono olefin having 6 through 20 carbon atoms, or its mixture. Such mono olefin monomer preferably includes, for example, hexene-1, octene-1, decene-1, 2-ethyloctene-1, tridecene-1, octadecene-1 and the like. If mono olefins having 5 or less carbon atoms are polymerized in the presence of the present catalysts, the viscosity of the polymer so obtained increases and the viscosity index thereof decreases due to high reactivity of the mono olefins. The mono olefin is used in the polymerization reaction in an amount of 20 through 1000 mol, preferably 33 through 200 mol, per 1 mol of the aluminum halide which is used in the catalyst preparation.

The polymerization is carried out in accordance with the following procedure.

A specified amount of said aluminum halide is added to said fatty acid and kept at a temperature of 30° through 150° C. for 1 to 3 hours, while hydrogen halide generated in the course of the reaction is removed. After the completion of removal of the hydrogen halide, polymerization is generally carried out by the addition of the starting olefin. The polymerization is, in general, carried out in the absence of solvent. However, solvent such as, for example, n-pentane, 1-octane, trichloroethane, tetrafluoroethane or the like may be used for the purpose of easy control of the reaction temperature. The suitable amount of the solvent is within the range of from 25 to 200% by volume.

The polymerization temperature is generally within the range of from 50° to 130° C., although it depends on the kind of fatty acids which constitute the catalyst and the ratio of the fatty acid and the aluminum halide. Generally speaking, a polymer having a high viscosity is obtained as the polymerization temperature decreases and a polymer having a low viscosity is obtained as the polymerization temperature increases. However, an excessively high polymerization temperature tends to decrease the viscosity index of the polymer. The viscosity of the polymer is preferably controlled by the selection of the fatty acid in the preparation of the catalyst rather than by the polymerization temperature. For instance, if a catalyst prepared by a fatty acid having 8 through 10 carbon atoms is used, an olefin polymer having a kinetic viscosity of 15 through 30 c.s. at 100° F. can be produced. On the other hand, if a catalyst prepared by a fatty acid having 3 through 6 carbon atoms is used, an olefin polymer having a kinetic viscosity of 30 through 50 c.s. can be produced.

The polymer thus produced is treated in the conventional manner, and unreacted monomer and olefin dimer are removed from the polymerization product by means of distillation or extraction. In the case where it is desired to improve the heat stability and oxidation stability of the polymer by the use of hydrogenating catalysts such as a Raney nickel catalyst, nickeldiatomaceous earth catalyst and the like, the olefin polymer can be hydrogenated.

As will be clear from the above detailed explanation, according to the present invention, excessive heat generation does not occur during the catalyst preparation process and, since the carboxy group is stabilized because the fatty acid and aluminum halide are condensed to form an aluminum soap of the fatty acid, the addition of the carboxyl group to the ends of the olefin polymer does not occur. Accordingly, the polymerization catalyst prepared by the present invention exhibits a stable catalyst effect for the polymerization of a mono olefin having 6 through 20 carbon atoms and halogen does not contaminate into the olefin polymer.

The present invention will be further illustrated by, but is by no means limited to, the following examples together with comparative examples.

EXAMPLE 1

Fatty acid and aluminum halide, both shown in Table 1 below, were charged into 1 liter of a glass autoclave provided with an agitator, and heated to a temperature of 70° C., while the generated hydrogen halide gas was removed. Thus, a polymerization catalyst was prepared. Then, into the autoclave, 600 g of octene-1 was dropwise added and polymerized at a temperature of 110° C. for 5 hours. After the completion of the polymerization, ammonia gas was blown into the polymerization product to deactivate the catalyst and the separated catalyst was filtered off. The polymerization product was then distilled to remove the unreacted monomer and the olefin dimer. Thus, polymerized oil was obtained.

The varieties of fatty acids and aluminum halides used, molar ratios of the [aluminum halides] *fatty acids* to the [fatty acids] *aluminum halides*, calorific values during the preparation of the catalysts, yields of the polymerized oils, kinetic viscosity values at 100° F. and viscosity indexes of the polymerized oils are shown in Table 1 below. The calorific value is calculated based upon the aluminum halide by the determination of the temperature difference when the fatty acid and the aluminum halide are added under agitation into a 500 ml Dewar vessel provided with a stirrer and containing 200 g of liquid paraffin.

TABLE 1

| Run No. | Fatty Acid | | Aluminum halide | Molar ratio | Calorific Value (kcal/mol) | Yield of Polymerized Oil (%) | Viscosity (C.S.) | Viscosity Index (VIE) |
|---|---|---|---|---|---|---|---|---|
| 1 | Acetic Acid** | (5.4g) | $AlCl_3$(12g) | 1.0 | 5.2 | 96 | 86.1 | 133 |
| 2 | Propionic Acid | (7.7g) | $AlCl_3$(12g) | 1.15 | 5.3 | 94 | 45.8 | 135 |
| 3 | Iso-Butyric Acid | (7.9g) | $AlBr_3$(24g) | 1.0 | 5.3 | 94 | 35.4 | 135 |
| 4 | n-valeric Acid | (9.2g) | $AlCl_3$(12g) | 1.0 | 4.8 | 90 | 31.5 | 134 |
| 5 | Caproic Acid | (10.5g) | $AlCl_3$(12g) | 1.0 | 4.5 | 87 | 25.5 | 134 |
| 6 | Caprilic Acid | (13.0g) | $AlCl_3$(12g) | 1.0 | 3.7 | 85 | 19.0 | 128 |
| 7 | 2-Ethyl Hexanoic Acid | (13.0g) | $AlCl_3$(12g) | 1.0 | 5.6 | 84 | 20.3 | 129 |
| 8 | 2-Ethyl Hexanoic Acid | (13.0g) | $AlBr_3$(24g) | 1.0 | 5.2 | 81 | 17.8 | 127 |
| 9 | Capric Acid | (15.5g) | $AlCl_3$(12g) | 1.0 | 3.5 | 73 | 21.0 | 145 |

**A Comparative Example

EXAMPLE 2

9.7 g of 2-ethyl hexanoic acid and 9.0 g of aluminum chloride (molar ratio of 1:1) were charged into a 1 liter glass autoclave provided with an agitator and, then, heated to a temperature of 50° C., while the generated hydrogen chloride was removed. Then, 600 g of an olefin, listed in Table 2 below, was added dropwise to the autoclave and polymerized at a temperature of 110° C. for 5 hours. After the completion of the polymerization, the polymerized oil was obtained in the same manner as in Example 1.

The varieties of the olefin used, yields of the polymerized oils, kinetic viscosity values and viscosity indexes of the polymerized oils are shown in Table 2 below.

TABLE 2

| Run No. | Olefin | Yield of Polymerized Oil (%) | Viscosity (C.S.) | Viscosity Index (VIE) |
|---|---|---|---|---|
| 10 | Butene-1** * | 98 | 120.3 | 90 |
| 12 | Hexene-1 | 89 | 17.0 | 115 |
| 13 | Octene-1 | 84 | 20.3 | 129 |
| 14 | Decene-1 | 84 | 23.5 | 145 |
| 15 | Tridecene-3 | 75 | 39.4 | 140 |
| 16 | Mixture of $C_6$–$C_{10}$ α-olefin | 85 | 19.0 | 132 |

*Gaseous butene-1 was blown into autoclave and polymerized
**A comparative example

EXAMPLE 3

A given amount of 2-ethyl hexanoic acid and 9.0 g of aluminum chloride were charged into a 1 liter glass autoclave provided with an agitator and, then, heated to a temperature of 70° C., while the generated hydrogen chloride was removed. 600 g of octene-1 was then added dropwise into the autoclave and polymerized at a temperature of 110° C. for 5 hours. After completion of the polymerization, polymerized oil was obtained in the same manner as in Example 1.

The molar numbers of the 2-ethyl hexanoic acid to one mol of the aluminum halide, calorific values determined in the same manner as in Example 1, yields of the polymerized oils, kinetic viscosity values and viscosity index values of the polymerized oils are shown in Table 3 below.

TABLE 3

| Run No. | Molar number of 2-ethyl hexanoic acid | Calorific Value (kca/mol) | Yield of Polymerized Oil (%) | Vis-cosity (C.S.) | Viscosity Index (VIE) |
|---|---|---|---|---|---|
| 17 | 0.7 | 5.0 | 98 | 102.3 | 141 |
| 18 | 0.8 | 5.2 | 95 | 56.5 | 140 |
| 19 | 1.1 | 5.9 | 78 | 17.6 | 129 |
| 20*** ** | 1.4 | 6.2 | | | |

**A comparative example
***Polymerization did not occur

COMPARATIVE EXAMPLE

Into a 500 ml Dewar vessel provided with a stirrer and containing 200 g of liquid paraffin, polyol derivative or fatty acid, and Lewis acid were charged and agitated. The temperature difference of this operation was determined and a calorific value was calculated from the temperature difference.

The correlations between polyol derivatives (or fatty acids) and Lewis acids used and calorific values are shown in Table 4 below, wherein the calorific values are represented based upon the Lewis acids.

TABLE 4

| Polyol derivative or fatty acid | | Lewis acid | Molar ratio | Calorific value (kca/mol) |
|---|---|---|---|---|
| 1,2-Diacetoxy ethane | (5.5g) | Aluminum chloride(10g) | 0.5 | 18.3 |
| 1,3-Diacetoxy propane | (6.0g) | Aluminum chloride(10g) | 0.5 | 17.5 |
| 1,4-Diacetoxy butane | (6.5g) | Aluminum chloride(10g) | 0.5 | 17.2 |
| 2-ethoxyethyl acetate | (4.9g) | Aluminum chloride(10g) | 0.5 | 10.7 |
| n-Butyric acid | (6.5g) | Boron trifluoride(5g) | 1.0 | 17.1 |
| n-Valeric acid | (7.5g) | Boron trifluoride(5g) | 1.0 | 15.9 |
| iso-Valeric acid | (7.5g) | Boron trifluoride(5g) | 1.0 | 16.1 |

What we claim is:

1. A process for preparing a catalyst for polymerization of a mono olefin having 6 through 20 carbon atoms comprising condensing: (a) an aliphatic carboxylic acid having 3 to 12 carbon atoms and, (b) aluminum chloride, aluminum bromide or a mixture thereof, in an amount of 0.7 through 1.2 mol of the component [(b)] *(a)* based upon 1 mol of the component [(a)] *(b)* at a temperature within the range of from 30° to 150° C.

2. The process as claimed in claim 1, wherein said condensing is carried out for 1 to 3 hours.

3. The process as claimed in claim 1, wherein said aliphatic carboxylic acid is at least one compound selected from the group consisting of propionic acid, n-butyric acid, iso-butyric acid, trimethyl acetic acid, n-valeric acid, iso-valeric acid, caproic acid, enanthic acid, caprilic acid, 2-ethyl hexanoic acid, capric acid and lauric acid.

4. The process as claimed in claim 1, wherein said amount of the component [(b)] *(a)* is within the range of from 0.8 to 1.1 mol based upon 1 mol of the component [(a)] *(b)*.

5. The process as claimed in claim 1, wherein said mono olefin is at least one compound selected from the group consisting of hexene-1, octene-1, decene-1, 2-ethyloctene-1, tridecene-1 and octadecene-1.

6. A catalyst for polymerization of mono olefin having 6 through 20 carbon atoms prepared by condensing: (a) an aliphatic carboxylic acid having 3 to 12 carbon atoms and (b) aluminum chloride, aluminum bromide or a mixture thereof, in an amount of 0.7 through 1.2 mol of the component [(b)] *(a)* based upon 1 mol of the component [(a)] *(b)*, at a temperature within the range of from 30° to 150° C.

7. The catalyst as claimed in claim 6, wherein said condensing is carried out for 1 to 3 hours.

* * * * *